United States Patent [19]
Furlani et al.

[11] Patent Number: 6,123,468
[45] Date of Patent: *Sep. 26, 2000

[54] MAGNETICALLY BIASED ELECTROMAGNETIC SHUTTERING DEVICE FOR CONTROLLING THE SHUTTER BLADES OF A CAMERA

[75] Inventors: Edward P. Furlani, Lancaster; J. Kelly Lee, Rochester, both of N.Y.

[73] Assignee: Eastman Kodak Company, Rochester, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/291,642

[22] Filed: Aug. 17, 1994

Related U.S. Application Data

[63] Continuation-in-part of application No. 08/107,551, Aug. 17, 1993, abandoned.

[51] Int. Cl.[7] .................................................. G03B 9/08
[52] U.S. Cl. .............................................. 396/463; 310/36
[58] Field of Search ................................ 354/234.1, 250, 354/271.1, 435, 439; 310/49 R, 36; 396/463

[56] References Cited

U.S. PATENT DOCUMENTS

| | | | |
|---|---|---|---|
| 3,517,599 | 6/1970 | Sapp, Jr. et al. | 354/423 |
| 3,635,141 | 1/1972 | Starp et al. | 354/235.1 |
| 4,088,405 | 5/1978 | Pustka et al. | 354/234.1 X |
| 4,338,013 | 7/1982 | Shimada et al. | 354/234.1 |
| 4,497,557 | 2/1985 | Petersen | 354/234.1 |
| 4,564,278 | 1/1986 | Ohmura | 354/234.1 X |
| 4,702,583 | 10/1987 | Yoshino et al. | 354/234.1 X |
| 4,973,866 | 11/1990 | Wang | 310/49 R |
| 5,126,605 | 6/1992 | Palmero | 310/36 |
| 5,155,522 | 10/1992 | Castor et al. | 354/234.1 X |

FOREIGN PATENT DOCUMENTS

| | | |
|---|---|---|
| 59-31934 | 2/1984 | Japan . |
| 63-36227 | 2/1988 | Japan . |
| 63-36229 | 2/1988 | Japan . |
| 63-167340 | 7/1988 | Japan . |
| 1-88524 | 4/1989 | Japan . |
| 2171809 | 9/1986 | United Kingdom . |

OTHER PUBLICATIONS

Clemens Hopfner, Photographic Shutter Oct. 1980 Research Disclosure No. 19844.

*Primary Examiner*—David M. Gray
*Attorney, Agent, or Firm*—David A. Howley; David A. Novais

[57] ABSTRACT

A magnetically biased electromagnetic shuttering device for controlling the shutter blades of a camera. The device includes a yoke having a core and a coil, the coil being capable of receiving current which produces a first magnetic field existing inside and outside the core. A movable magnet is coupled to the shutter blades, has a second magnetic field and is positioned adjacent to the core so that the second magnetic field interacts with the first magnetic field. A magnet, separate from the yoke, produces a third magnetic field and is positioned adjacent to the movable magnet in order to influence the motion of the movable magnet and to provide controllable detents for the movable magnet.

3 Claims, 5 Drawing Sheets

MAGNETICALLY BIASED ELECTROMAGNETIC SHUTTERING DEVICE FOR CONTROLLING THE SHUTTER BLADES OF A CAMERA

CROSS-REFERENCE TO RELATED APPLICATION

This application is a continuation-in-part of U.S. patent application Ser. No. 08/107,551 which was filed on Aug. 17, 1993, now abandoned, in the names of Furlani and Lee.

FIELD OF THE INVENTION

The invention relates generally to the field of photography, and particularly to an electromagnetically driven actuator that moves one or more camera shutter blades.

BACKGROUND OF THE INVENTION

Leaf type or blade type mechanical shutters have been used to regulate the amount of light that is going to reach the imaging areas of a filmstrip contained within a camera. Typically, the leaf type of shutter is an array of metal "blades" that are pivoted so that they all swing towards or away from the lens aperture of the camera. When the shutter is closed, all the blades are overlapping in the center of the lens aperture and no light reaches the filmstrip. To open the shutter, the blades pivot away from the center of the aperture, so that light may pass through the aperture and expose the filmstrip. Sometimes leaf type mechanical shutters may have one or more blades, each of which may have a different diameter opening. When a picture is taken the blade or blades swing away from the center of the lens aperture so that light may pass through the aperture, through the blade or blade openings to expose the filmstrip. If a picture is not being taken, the shutter will be closed. The power to open and close the leaf type mechanical shutters is provided by a spring or springs that are under tension and the timing is controlled by a watch-type gear train.

Electromagnetic shutters may be electronically controlled. The manufacturing cost of an electromagnetic shutter is less than the manufacturing cost of mechanical shutters.

The prior art utilized electromagnetics to control one or more shutter blades that were capable of having two or more aperture openings. Typically a magnet that was coupled to one or more shutter blade was placed between the poles of an electromagnet. When current in one direction was applied to the electromagnet, the shutter blades formed one aperture opening and when current was applied to the electromagnet in the opposite direction the shutter blades formed another aperture opening. If no current was applied to the electromagnet the magnet remained in its neutral position due to reluctance forces. The neutral position of the actuator was determined by the magnetic circuit of the electromagnet, or by some mechanical device that was attached to the actuator and supplied a restoring force to the actuator, such as a mechanical detent device. The restoring force would bring the actuator or pivot arm back to the neutral position.

If no device was used to bring the actuator to its neutral position the actuator would oscillate around its neutral position until it reached its equilibrium position. The oscillations were undesirable since the location of the actuator was not known at all times. Thus, in a totally magnetic circuit it took time for the actuator to settle down to its detent or balance point.

If a mechanical device e.g. a spring was used to bring the actuator to its balance point. The spring would have to be physically attached to the actuator and to a solid portion of the camera, with no intervening objects between the spring attachment point and the actuator. Thus, the use of a spring caused space and positioning problems. Another disadvantage in using a spring was that the physical characteristics of the spring would not remain constant as the spring aged. Thus, the same amount of restoring force would not be placed on the spring thereby impacting actuator performance.

SUMMARY OF THE INVENTION

The present invention is directed to overcoming one or more of the problems set forth above. Briefly summarized, according to one aspect of the present invention, a magnetically biased electromagnetic shuttering device for controlling the shutter blades of a camera includes a yoke having a core and a coil. The coil is capable of receiving current and produces a first magnetic field existing inside and outside the core. A movable magnet is coupled to the shutter blades and has a second magnetic field. The movable magnet is positioned in proximity to the core so that the second magnetic field interacts with the first magnetic field. Biasing means produce a third magnetic field and is positioned in proximity to the movable magnet in order to influence the motion of the movable magnet, and to provide controllable detents for the movable magnet.

ADVANTAGEOUS EFFECTS OF THE INVENTION

The present invention overcomes the disadvantages of the prior art by providing a magnetically controllable neutral position. Thereby eliminating the need for physical contact with a mechanical device.

One of the advantages of this invention is that the biasing magnet provides a well defined detent position.

Another advantageous effect of this invention is that the positioning control is accomplished without having the actuator being physically connected to the biasing magnet.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENT

Figure 1:
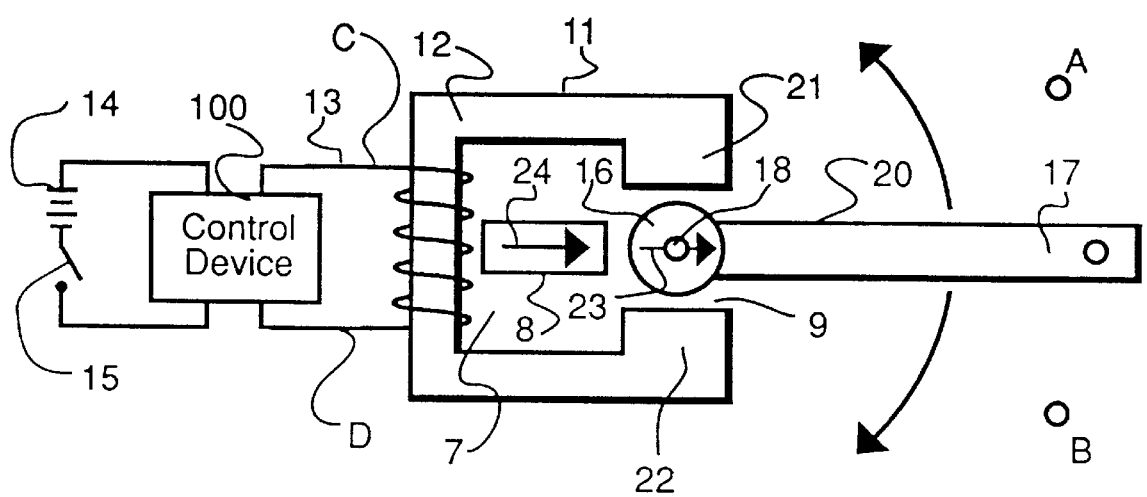
FIG. 1 is a drawing that shows actuator 20 of the apparatus of this invention in the same plane as the magnet that is used to drive actuator 20.

Referring now to the drawings in detail, and more particularly to FIG. 1, the reference character 11 represents an armature that includes a core 12 and coil 13. One end of coil 13 is connected to one of the two ends of polarity controlling device 100 and the other end of coil 13 is connected to the other end of device 100. Device 100 controls the direction of current flow in coil 13. The manner in which the coil current is controlled will be more fully set forth in the description of FIG. 8. Switch 15 is connected to the negative terminal of battery 14 and to control device 100. The positive terminal of battery 14 is connected to polarity controlling device 100.

Actuator 20 includes a permanent magnet 16 and a member 17 that is attached thereto. Magnet 16 pivots about axis 18 and magnet 16 is placed within gap 9 of core 12. Member 17 is able to pivot between stop points A and B. Magnet 16 is magnetized as indicated by arrow 23. The head of arrow 23 represents the North pole of magnet 16 and the tail of arrow 23 represents the South pole of magnet 16.

A bias magnet 8 is positioned within space 7 of core 12. Magnet 8 is magnetized as indicated by arrow 24, wherein the head of arrow 24 represents the North pole of magnet 8 and the tail of arrow 24 represents the South pole of magnet 8.

When switch 15 is open, no current will be supplied to coil 13 and actuator 20 will be positioned in the detent position, the position shown in FIG. 1. The closing of switch 15 causes a current from battery 14 to appear in coil 13 and coil 13 to induce a magnetic field. The direction in which the current flows through coil 13 is determined by control circuit 100. In one instance the current will flow coil 13 from point C to point D and in that instance pole 21 of core 12 will act as a North pole and pole 22 of core 12 will act as a South pole. Pole 21 will attract the South pole of magnet 16 and cause actuator 20 to rotate to position B. In the other instance control circuit 100 will cause current to flow in coil 13 from point D to point C and in that instance pole 21 of core 12 will act as a South pole and pole 22 of core 12 will act as a North pole. Pole 21 will attract the North pole of magnet 16 and cause actuator 20 to rotate to position A.

When the current traveling through coil 13 is turned off or changes direction biasing magnet 8 will attract the South pole of magnet 16 and cause magnet 16 to return to its detent position, that is the position shown in FIG. 1. Magnet 8 enables actuator 20 to have a well defined and controllable detent position with greatly reduced oscillations. If magnet 8 was not present, the detent position as shown in FIG. 1, would not be a stable position for armature 20. Armature 20 would rotate to stop points A or B.

Figure 2:
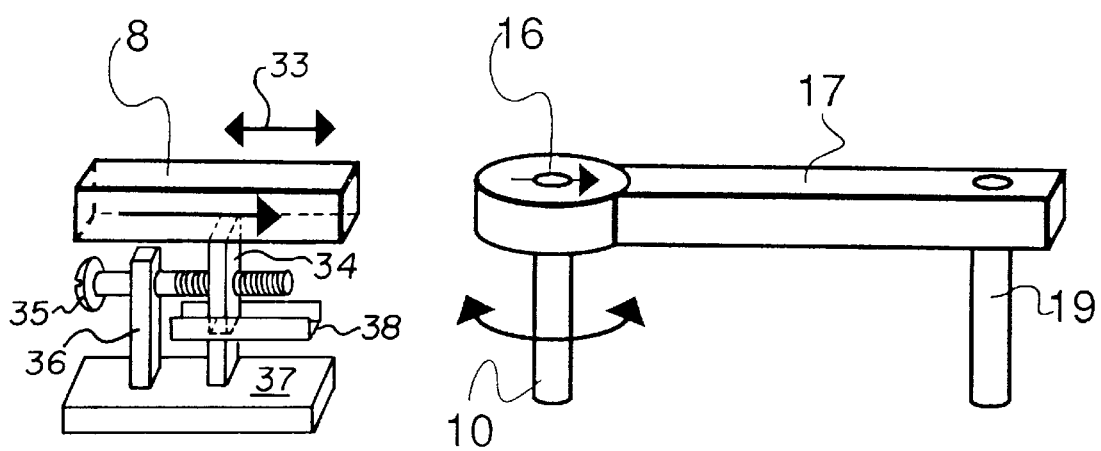
FIG. 2 is a side view of biasing magnet 8 and actuator 20 of FIG. 1.

FIG. 2 is a side view of actuator 20 and magnet 8 of FIG. 1. Actuator 20 has a pivot pin 10 which is attached to magnet 16 and a pin 19 that is used to connect member 17 to the shutter blades hereinafter described. Member 17 may be made of any non-magnetic material, i.e. plastic. Magnet 8 is supported by a support member 34. A screw 35 passes through a threaded aperture in support member 34 and a non-threaded aperture in member 36. The non-threaded aperture has a protrusion which engages an annular notch in the non-threaded portion of screw 35 to prevent the screw from moving in the direction of an arrow 33. Member 36 is secured to a camera body 37. A channel member 38 prevents member 34 and magnet 8 from rotating about an axis defined by screw 35. By rotating screw 35 in one direction or the other, magnet 8 can be moved towards or away from magnet 16 in the direction of arrow 33.

Being able to move magnet 8 allows the system to be fine tuned. If magnet 8 is too close to magnet 16, the magnetic attraction between magnets 8,16 will be too strong. Thus, the electromagnetic force may not be able to overcome the force of bias magnet 8 to move member 17 to stop A or B. If magnet 8 is too far from magnet 16, the magnetic attraction between these two magnets will be too weak, allowing member 17 to flip to position A or B, when the electromagnet is turned off, due to stray magnetic fields between magnet 16 and core 12. By allowing magnet 8 to be moved towards or away from magnet 16, the strength of the magnetic force between magnets 8 and 16 can be precisely controlled.

Figure 3:
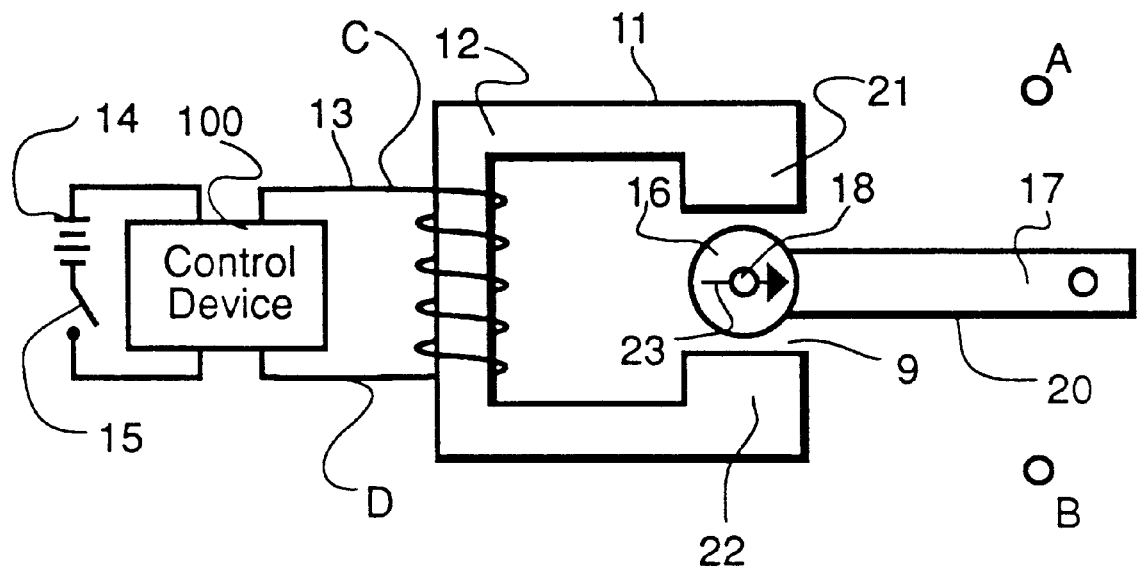
FIG. 3 is a drawing similar to FIG. 1 showing an alternate embodiment of the invention.

FIG. 3 is an alternate embodiment of the invention shown in FIG. 1. Armature 11 includes a core 12 and coil 13. One end of coil 13 is connected to one of the two ends of polarity controlling device 100 and the other end of coil 13 is connected to the other end of device 100. Device 100 controls the direction of current flow in coil 13. The manner in which the coil current is controlled will be more fully set forth in the description of FIG. 8. Switch 15 is connected to the negative terminal of battery 14 and to control device 100. The positive terminal of battery 14 is connected to polarity controlling device 100.

Actuator 20 includes a permanent magnet 16 and a member 17 that is attached thereto. Magnet 16 pivots about axis 18 and magnet 16 is placed within gap 9 of core 12. Member 17 is able to pivot between stop points A and B. Magnet 16 is magnetized as indicated by arrow 23. The head of arrow 23 represents the North pole of magnet 16 and the tail of arrow 23 represents the South pole of magnet 16.

When switch 15 is open, no current will be supplied to coil 13 and actuator 20 will be positioned in the detent position, the position shown in FIG. 3. The closing of switch 15 causes a current from battery 14 to appear in coil 13 and coil 13 to induce a magnetic field. The direction in which the current flows through coil 13 is determined by control circuit 100. In one instance the current will flow in coil 13 from point C to point D and in that instance pole 21 of core 12 will act as a North pole and pole 22 of core 12 will act as a South pole. Pole 21 will attract the South pole of magnet 16 and cause actuator 20 to rotate to position B. In the other instance control circuit 100 will cause current to flow in coil 13 from point D to point C and in that instance pole 21 of core 12 will act as a South pole and pole 22 of core 12 will act as a North pole. Pole 21 will attract the North pole of magnet 16 and cause actuator 20 to rotate to position A.

Figure 4:
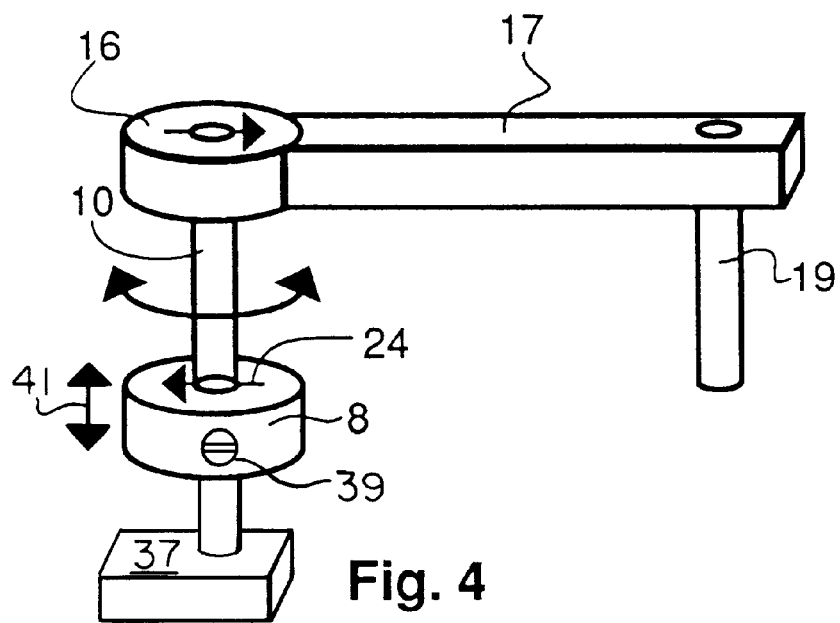
FIG. 4 is a side view of biasing magnet 8 and actuator 20 of FIG. 3.

FIG. 4 is a side view of actuator 20 of FIG. 3. Actuator 20 has a pivot pin 10 which is attached to magnet 16 and magnet 8. Pivot pin 10 is secured to camera body 37. Magnet 16 rotates about pivot pin 10. A pin 19 is used to connect member 17 to the shutter blades hereinafter described. Member 17 may be made of any non-magnetic material, i.e. plastic.

Bias magnet 8 is perpendicular to magnet 16. Magnet 8 is magnetized as indicated by arrow 24, wherein the head of arrow 24 represents the North pole of magnet 8 and the tail of arrow 24 represents the South pole of magnet 8. A set screw 39 secures magnet 8 to pivot pin 10. By loosening the set screw, magnet 8 can be moved towards or away from magnet 16 in the direction of doubleheaded arrow 41. Magnet 8 can also be rotated about pivot pin 10. After magnet 8 is properly positioned, set screw 39 is retightened. As explained above, providing for relative movement between magnets 8 and 16 allows the system to be fine tuned.

When the current traveling through coil 13 is turned off or changes direction biasing magnet 8 will attract the South pole of magnet 16 and cause magnet 16 to return to its detent position, that is the position shown in FIG. 3. Magnet 8 enables actuator 20 to have a well defined and controllable detent position with greatly reduced oscillations. If magnet 8 was not present, the detent position as shown in FIG. 3, would not be a stable position for armature 20. Armature 20 would rotate to stop points A or B.

Figure 5:
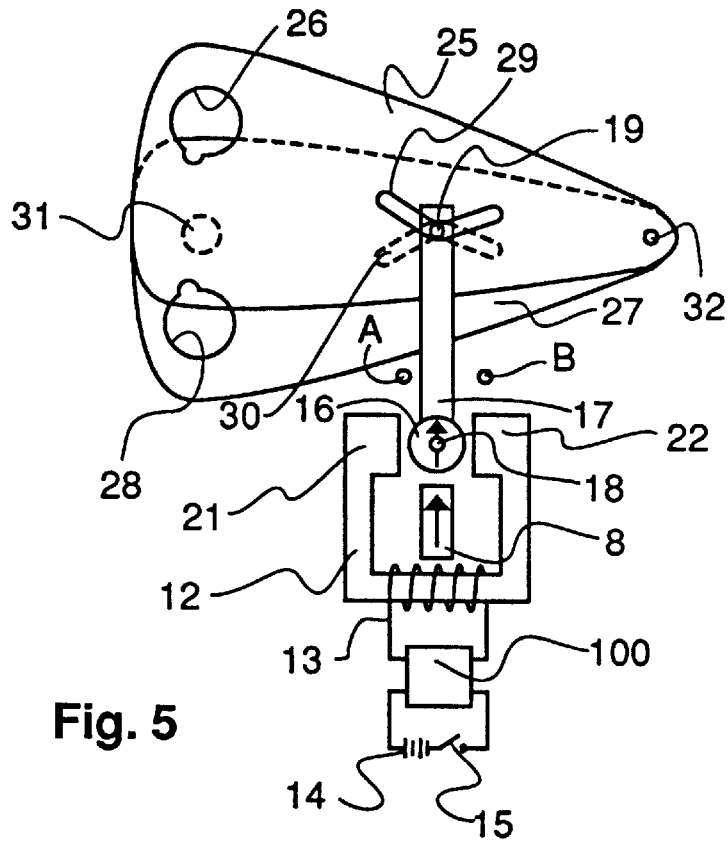
FIG. 5 is a diagram that illustrates actuator 20 in the detent position and two shutter blades blocking the aperture.

FIG. 5 shows member 17 and magnet 16 having the position shown in FIG. 1 and FIG. 3(the detent position) with coil 13 wrapped around core 12 (which has pole pieces 21 and 22). Switch 15 is connected to one of the ends of control device 100 and to the negative terminal of battery 14. The positive terminal of battery 14 is connected to polarity control device 100. Device 100 is also connected to the ends of coil 13. Device 100 controls the direction of current flow in coil 13. The manner in which the coil current is controlled will be more fully set forth in the description of FIG. 8.

Shutter blade 25 has an aperture orifice 26 and shutter blade 27 has an aperture orifice 28. Slots 29 and 30 are in blades 25 and 27. Blades 25 and 27 are shown in a closed position with blade 27 positioned under blade 25. In this position blades 25 and 27 completely cover aperture 31 and do not permit any light to enter the optical path of the camera (not shown). Actuation pin 19 of member 17 is placed in slots 29 and 30 of blades 25 and 27. Pivot point 32 of blades 25 and 27 and pivot axis 18 of actuator 17 are connected to the camera (not shown). Thus, actuator 17 will pivot about axis 18 and blades 25 and 27 will pivot about point 32. In this instance shutter switch 15 is open, and no current will be supplied to coil 13. Member 17 will be in the detent position and shutter blades 25 and 27 will completely cover aperture 31.

Figure 6:
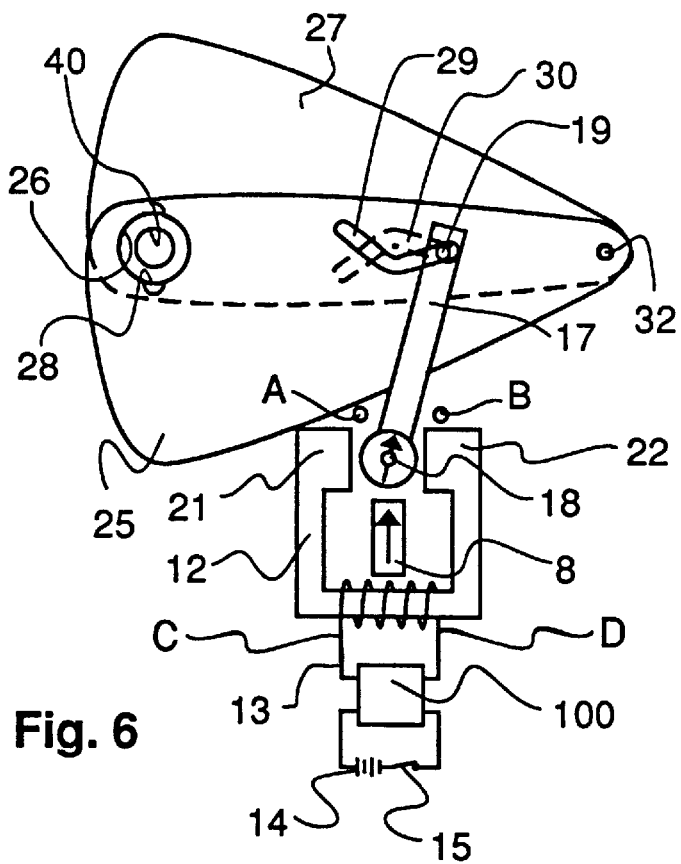
FIG. 6 is a diagram that illustrates actuator 20 at point B and two shutter blades forming a large aperture opening.

FIG. 6 shows the components illustrated in FIG. 5 with shutter switch 15 closed. The description of FIG. 8 will describe how device 100 causes current to flow from point C through coil 13 to point D or how device 100 causes current to flow from point D through coil 13 to point C. Coil 13 will induce a magnetic field. The magnetic field causes pole 21 of core 12 to act as a North pole and pole 22 of core 12 to act as a South pole. Pole 21 will attract the South pole of magnet 16 and cause member 17 to pivot about axis 18 and move to stop point B. The pivoting of member 17 causes pin 19 to move in slots 29 and 30 of blades 25 and 27. The movement of pin 19 in slots 29 and 30 will cause blades 25 and 27 to pivot about point 32 and move to the orientation shown in FIG. 6. Blade 27 will be under blade 25 and blades 25 and 27 will be in their maximum open position. Aperture orifices 26 and 28 will form a large aperture opening 40 to allow the maximum amount of light to enter the camera (not shown).

Figure 7:
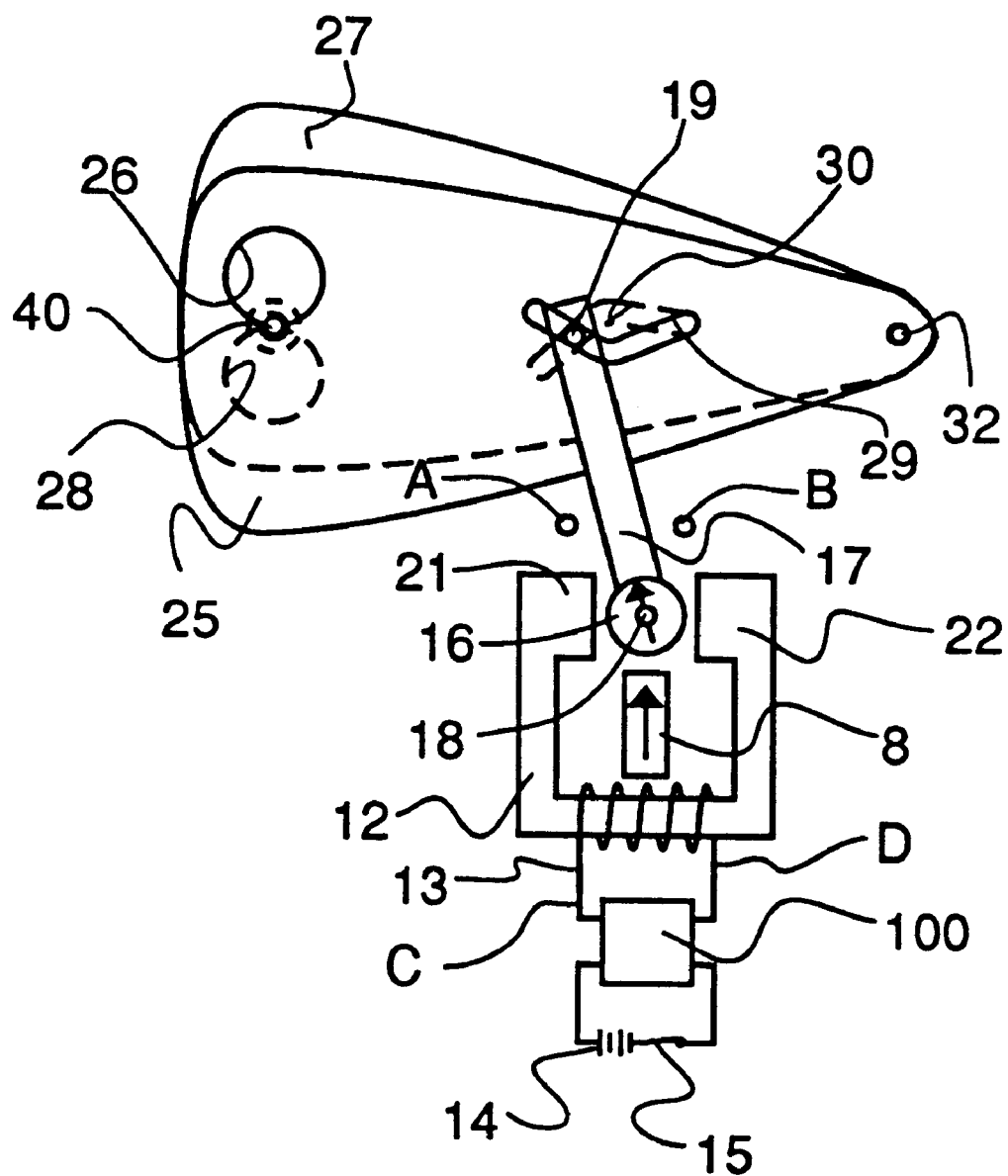
FIG. 7 is a diagram that illustrates actuator 20 at point A and two shutter blades forming a small aperture opening.

FIG. 7 shows the components illustrated in FIG. 5 with shutter switch 15 closed and pole pieces 21 and 22 having the opposite polarity that they had in FIG. 5. The description of FIG. 8 will describe how device 100 causes current to flow from point D through coil 13 to point C. Coil 13 will induce a magnetic field. The magnetic field causes pole 21 of core 12 to act as a South pole and pole 22 of core 12 to act as a North pole. Pole 21 will attract the North pole of magnet 16 and cause member 17 to pivot about axis 18 and move to point A. The pivoting of member 17 causes pin 19 to move in slots 29 and 30 of blades 25 and 27. The movement of pin 19 in slots 29 and 30 will cause blades 25 and 27 to pivot about point 32 and move to the orientation shown in FIG. 7. Blade 27 will be under blade 25 and blades 25 and 27 will be in their minimum open position. Aperture orifices 26 and 28 will form a small aperture opening 40 to allow a small amount of light to enter the camera (not shown).

Figure 8:
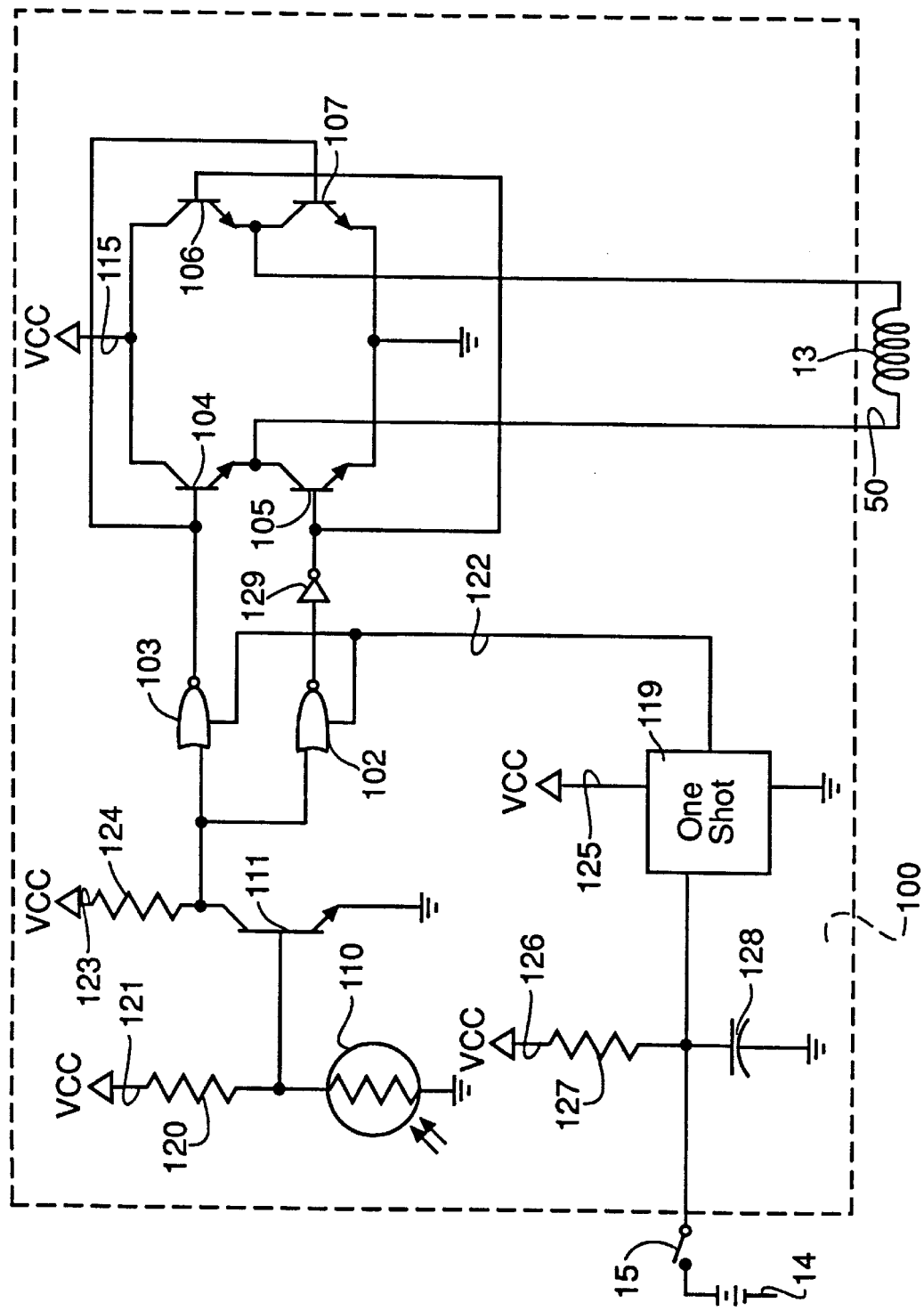
FIG. 8 is a logic diagram of the device for controlling the polarity of the coil shown in FIG. 1,3,5,6 and 7.

FIG. 8 describes polarity controlling device 100 that was shown in FIGS. 1, 3, 5, 6 and 7. Photocell 110 has two terminals. The first terminal is connected to ground, and the second terminal is connected to the base of NPN transistors 111 and one of the ends of resistor 120. The other end of resistor 120 is connected to the positive terminal of battery 14 via wire 121. The emitter of transistor 111 is connected to ground and the collector of transistor 111 is connected to the inputs of NOR gates 102 and 103. The strobe input to gates 102 and 103 is the output of one shot 119 and is transmitted on line 122. The collector of transistor 111 is also connected to one of the ends of resistor 124 and the other end of resistor 124 is connected to the positive terminal of battery 14 via wire 123. The output of gate 102 is coupled to the input of inverter 129 and the output of inverter 129 is coupled to the base of NPN transistor 105 and the base of NPN transistor 106. The output of gate 103 is connected to the base of NPN transistor 104 and the base of NPN transistor 107. The emitter of transistor 104 is tied to the collector of transistor 105 and the emitter of transistor 104 and the collector of transistor 105 are connected to one of the ends of coil 13. The collector of transistor 104 is connected to the collector of transistor 106 and the collectors of the aforementioned transistors are connected to the positive terminal of battery 14 via wire 115. The emitter of transistor 105 is connected to the emitter of transistor 107 and the emitter of the above transistors are connected to ground. One of the ends of coil 13 is connected to the collector of transistor 107 and the emitter of transistor 106.

One of the ends of resistor 127 is coupled to the positive terminal of battery 14 via wire 126, and the other end of resistor 127 is connected to one of the ends of capacitor 128. Resistor 127 is also connected to the input of one shot 119, and to switch 15. Switch 15 is connected to the negative terminal of battery 14. The other end of capacitor 128 is coupled to ground. One shot 119 is coupled to the positive terminal of battery 14 via wire 125 and one shot 119 is also connected to ground.

The pressing of shutter switch 15 will cause a negative ground potential to be placed on the input of one shot 119, which will cause one shot 119 to have a pulsed output which will strobe the inputs of NOR gates 102 and 103. NOR gates 102 and 103 are configured as inverters. When NOR gates 102 and 103 are enabled by the pulse from one shot 119, their outputs will control transistors 104, 105, 106 and 107 in either a forward fashion or no fashion at all depending on the polarity of the pulse.

The outputs of NOR gates 102 and 103 are determined by photocell 110. If little or low light is present when someone takes a picture with a camera (not shown) the set trip point of photocell 110 would be at a high potential. This would cause the base of transistor 111 to be at a high potential. Thus, transistor 111 would be off, and a high potential would be on the inputs of NOR gates 102 and 103. With a high input on NOR gates 102 and 103 there would be a low output from NOR gates 102 and 103. The output of gate 102 is inverted by inverter 129. Thus, inverter 129 has a high output which causes transistors 105 and 106 to be in an off state. The low output from NOR gate 103 goes to the bases of transistor 104 and 107 causing them to turn on. At this juncture current is transmitted from battery 14 via wire 115 through transistor 104 and through coil 13 through transistor 107 to ground. The foregoing described the low light condition illustrated in FIG. 6. In this instance pole piece 21 of FIG. 6 will act as a North pole. Hence, actuator 17 will pivot to the position shown in FIG. 6 and shutter blades 25 and 27 will be in their maximum open position causing the maximum aperture opening.

When photocell 110 senses a high light condition, photocell 110 causes the base of transistor 111 (whether switch 15 is depressed or not) to turn on. This causes the inputs to NOR gates 102 and 103 to be low, and the outputs of NOR gates 102 and 103 to be high. The output from NOR gate 103 causes transistors 104 and 107 to be high. Thus transistors 104 and 107 are in an off state. The output of inverter 102 is high which causes the output of inverter 129 to be low. This causes transistors 105 and 106 to be turned on which allows current to be transmitted from battery 14 via wire 115 to go through transistor 106 through coil 13 through transistor 105 to ground. Thus, the current traveled in an opposite direction that was previously described. The foregoing is only allowed to happen during the output pulse of one shot 119 that turns on the strobe input of NOR gates 102 and 103. This only happens when switch 15 is depressed, i.e. when someone wants to take a picture.

In the case where current is transmitted through transistor 106 the light condition illustrated in FIG. 7 would be present. Pole piece 22 of FIG. 7 would act as a North pole. Hence, actuator 17 would pivot to the position shown in FIG. 7 and shutter blades 25 and 27 will be in their minimum open position. Aperture orifices 26 and 28 will form a small aperture opening to allow a small amount of light to enter the camera (not shown).

If switch 15 was not depressed, i.e. if someone did not want to take a picture with the camera (not shown), one shot 119 would not have an output pulse which would strobe the inputs of NOR gates 102 and 103. Thus, no current would be supplied to coil 13 and the condition illustrated in FIG. 5 would be present. Hence, actuator 17 would pivot to the position shown in FIG. 5 (detent position) so that shutter blades 25 and 27 will completely cover aperture 31.

The above specification describes a new and improved device for electromagnetically controlling the shutter of a camera. It is realized that the above description may indicate to those skilled in the art additional ways in which the principles of this invention may be used without departing from the spirit. It is, therefore, intended that this invention be limited only by the scope of the appended claims.

| Parts List | |
|---|---|
| space | 7 |
| bias magnet | 8 |
| gap | 9 |
| pivot pin | 10 |
| armature | 11 |
| core | 12 |
| coil | 13 |
| battery | 14 |
| switch | 15 |
| permanent magnet | 16 |
| member | 17 |
| axis | 18 |
| pin | 19 |
| actuator | 20 |
| pole | 21 |
| pole | 22 |
| arrow | 23 |
| arrow | 24 |
| shutter blade | 25 |
| aperture orifice | 26 |
| shutter blade | 27 |
| aperture orifice | 28 |
| shutter blade | 25 |
| aperture orifice | 26 |
| shutter blade | 27 |
| aperture orifice | 28 |
| *-continued* | |
| Parts List | |
| slot | 29 |
| slot | 30 |
| aperture | 31 |
| pivot point | 32 |
| doubleheaded arrow | 33 |
| support member | 34 |
| screw | 35 |
| member | 36 |
| camera body | 37 |
| channel member | 38 |
| set screw | 39 |
| aperture opening | 40 |
| doubleheaded arrow | 41 |
| polarity controlling device | 100 |
| NOR gate | 102 |
| NOR gate | 103 |
| NPN transistor | 104 |
| NPN transistor | 105 |
| NPN transistor | 106 |
| NPN transistor | 107 |
| photocell | 110 |
| NPN transistor | 111 |
| wire | 115 |
| one shot | 119 |
| resistor | 120 |
| wire | 121 |
| line | 122 |
| wire | 123 |
| resistor | 124 |
| wire | 125 |
| wire | 126 |
| resistor | 127 |
| capacitor | 128 |
| inverter | 129 |

What is claimed is:

1. A magnetically biased electromagnetic shuttering device for controlling the shutter blades of a camera, said device comprising:

a yoke including a core and a coil, said core comprising a space which opens to a gap, said coil which is capable of receiving current produces a first magnetic field existing inside and outside said core;

a first magnet coupled to the shutter blades and movable about a first axis to control a movement of the shutter blades, said first magnet having a second magnetic field and being positioned adjacent said core so that said second magnetic field interacts with said first magnetic field, said first magnet being located in said gap;

a second magnet, separate from said yoke, for producing a third magnetic field, said second magnet is positioned in said space of said core adjacent to said first magnet in order to influence a movement of said first magnet, said second magnet creating an attractive force against said first magnet to provide controllable detents for said first magnet; and a mechanism adapted to move said second magnet toward and away from said first magnet along a second axis which is substantially perpendicular to the first axis, so as control a strength of said attractive force.

2. A magnetically biased electromagnetic shuttering device for controlling the shutter blades of a camera, said device comprising:

a yoke comprising a core and a coil, said coil which is capable of receiving current produces a first magnetic field existing inside and outside said core;

a movable magnet positioned in a first plane and coupled to the shutter blades, said movable magnet having a second magnetic field and being positioned adjacent said core so that said second magnetic field interacts with said first magnetic field;

a magnetic member separate from said yoke, for producing a third magnetic field, said magnetic member being positioned on a second plane which is separate from said first plane so as to influence the motion of said movable magnet and to provide controllable detents for said movable magnet; and an adjustment member which is adapted to adjust a relative position between said magnetic member and said movable magnet, said adjustment member permitting a rotation and a linear movement of said magnetic member;

wherein said movable magnet is mounted to a pivot pin so as to be rotatable about an axis defined by the pivot pin.

3. The device according to claim 2, wherein said magnetic member is mounted on said pivot pin so as to be coaxial with said movable magnet, said magnetic member being linearly movable toward and away from said movable magnet along the axis defined by said pivot pin and being rotatable about the axis defined by said pivot pin.

* * * * *